United States Patent

Shadle et al.

(10) Patent No.: US 6,395,043 B1
(45) Date of Patent: May 28, 2002

(54) PRINTING ELECTROCHEMICAL CELLS WITH IN-LINE CURED ELECTROLYTE

(75) Inventors: Mark A. Shadle; David M. Good, both of Peachtree City, GA (US); Andrew J. Friesch, Cedarburg, WI (US); Chauncey T. Mitchell, Jr.; Gerrit L. Verschuur, both of Lakeland, TN (US)

(73) Assignee: Timer Technologies, LLC, Algoma, WI (US)

( * ) Notice: Subject to any disclaimer, the term of this patent is extended or adjusted under 35 U.S.C. 154(b) by 0 days.

(21) Appl. No.: 09/448,371

(22) Filed: Nov. 23, 1999

Related U.S. Application Data

(60) Provisional application No. 60/109,943, filed on Nov. 25, 1998.

(51) Int. Cl.$^7$ ............................................. H01M 10/38
(52) U.S. Cl. ...................... 29/623.4; 29/623.3; 429/124
(58) Field of Search ................................ 429/124, 162; 29/623.3, 623.4

(56) References Cited

U.S. PATENT DOCUMENTS

| | | | |
|---|---|---|---|
| 2,688,649 A | 9/1954 | Bjorksten | 136/111 |
| 3,006,980 A | 10/1961 | Story | 136/6 |
| 3,209,255 A | 9/1965 | Estes et al. | 324/94 |
| 3,230,115 A | 1/1966 | Tamminen | 136/111 |
| 3,607,430 A | 9/1971 | Glover | 136/111 |
| 3,993,508 A * | 11/1976 | Erlichman | 29/623.2 |
| 4,153,345 A | 5/1979 | Duchene et al. | 350/363 |
| 4,161,815 A | 7/1979 | Land et al. | 29/623.4 |
| 4,172,184 A | 10/1979 | Bloom et al. | 429/162 |
| 4,177,552 A | 12/1979 | Gordon et al. | 29/623.4 |
| 4,242,424 A | 12/1980 | Buckler et al. | 429/152 |
| 4,389,470 A | 6/1983 | Plasse | 429/152 |
| 4,400,452 A | 8/1983 | Bruder | 429/152 |
| 4,539,275 A | 9/1985 | Plasse | 429/152 |
| 4,609,597 A | 9/1986 | Plasse | 429/122 |
| 4,614,026 A | 9/1986 | Plasse | 29/623.3 |
| 4,614,695 A | 9/1986 | Ibbott | 429/127 |
| 4,664,993 A | 5/1987 | Sturgis et al. | 429/178 |
| 4,749,875 A | 6/1988 | Hara | 307/150 |
| 4,756,717 A | 7/1988 | Sturgis et al. | 29/623.3 |
| 4,804,275 A | 2/1989 | Kang et al. | 374/162 |
| 5,035,965 A | 7/1991 | Sangyoji et al. | 429/124 |
| 5,055,968 A | 10/1991 | Nishi et al. | 361/395 |
| 5,147,985 A | 9/1992 | DuBrucq | 174/260 |
| 5,225,291 A | 7/1993 | Rao | 429/51 |
| 5,250,905 A | 10/1993 | Kuo et al. | 324/435 |
| 5,339,024 A | 8/1994 | Kuo et al. | 324/435 |
| 5,350,645 A | 9/1994 | Lake et al. | 429/124 |
| 5,392,032 A | 2/1995 | Kline et al. | 340/604 |
| 5,396,177 A | 3/1995 | Kuo et al. | 324/435 |
| 5,418,086 A | 5/1995 | Bailey | 429/93 |
| 5,495,250 A | 2/1996 | Ghaem et al. | 342/51 |
| 5,518,841 A * | 5/1996 | Sotomura et al. | 429/213 |
| 5,542,959 A | 8/1996 | Tuttle | 29/623.3 |
| 5,563,002 A | 10/1996 | Harshe | 429/7 |
| 5,627,472 A | 5/1997 | Ofer et al. | 324/435 |
| 5,635,312 A | 6/1997 | Yanagisawa et al. | 429/94 |
| 5,637,418 A | 6/1997 | Brown et al. | 429/127 |
| 5,652,043 A | 7/1997 | Nitzan | 428/209 |
| 5,656,393 A | 8/1997 | Boer et al. | 429/217 |
| 5,763,058 A | 6/1998 | Isen et al. | 428/209 |
| 6,030,721 A * | 2/2000 | Lake | 429/162 X |

* cited by examiner

*Primary Examiner*—John S. Maples
(74) *Attorney, Agent, or Firm*—Eugene Stephens & Associates; Thomas B. Ryan

(57) ABSTRACT

An electrolyte is formulated as a printing ink and laid down by an in-line press for manufacturing printed electrochemical cells. A curing station transforms the electrolyte to perform additional functions such as separating electrodes, preventing leakage, bonding cell layers, and resisting evaporation.

10 Claims, 4 Drawing Sheets

PRINTING ELECTROCHEMICAL CELLS WITH IN-LINE CURED ELECTROLYTE

This application claims the benefit of U.S. Provisional Application No. 60/109,943, filed on Nov. 25, 1998 which Provisional application is incorporated by reference herein.

TECHNICAL FIELD

Electrolytes considered for this invention are applied in layers and transformed to provide additional functions such as separating electrodes, holding position, preserving ionic conductivity, or bonding other layers of electrochemical cells. The electrolyte and electrode layers can be laid down by an in-line press in repeating patterns to manufacture a succession of thin, flexible, low cost, and low power electrochemical cells.

BACKGROUND

Printed electrochemical cells and batteries (multiple cells) are still relatively rare despite a number of published inventions relating to their manufacture, which involves printing at least some of their active layers and laminating others in sheet or web form. Some of the problems still affecting the success of printed electrochemical cells involve difficulties with printing effective electrolyte layers interconnecting layers of electrodes.

One early attempt at printing electrochemical cells is disclosed in U.S. Pat. No. 2,688,649 to Bjorksten. Electrode/electrolyte combinations are formulated as inks and laid down in repeating patterns by transfer printing, which includes letterpress or offset printing. Magnetic powders together with an electrolyte solution are suspended in a printing vehicle such as a drying oil or a resinous material. After printing, the ink is passed through an oriented magnetic field and dried. Another ink containing a different magnetic powder is printed over the first layer, magnetically oriented, and dried to complete a printed "dry cell". Although printed, the electrolyte is printed together with the electrode powders, which limits cell configurations (e.g., side-by-side electrodes) and the ability of the electrolyte to function as a separator between the electrodes.

U.S. Pat. No. 3,230,115 to Tamminen discloses printed electrochemical cells in which a metallic zinc electrode and a carbonaceous electrode are laid down side-by-side in repeating patterns and covered by a porous material wetted with electrolyte in the form of a viscous adhesive gel. The electrolyte is a calcium chloride solution gelled by wheat flour. The suggestions for printing include applying the electrode layers by coating and impregnating a porous paper with the electrolyte before applying the paper to the electrodes. Two more recent examples of printed cells with porous separators impregnated with electrolyte are disclosed in U.S. Pat. No. 5,055,968 to Nishi et al. and U.S. Pat. No. 5,652,043 to Nitzan. Although absorbed by a separator, such liquid electrolytes are difficult to confine and are subject to evaporation.

A solid electrolyte layer separates electrode layers of a printed cell disclosed in U.S. Pat. No. 5,350,645 to Lake et al. Accordingly, the electrolyte must be laminated rather than printed and is limited to unusual and expensive materials that are solid but contain moveable ions. For example, solid lithium iodide is suggested as an electrolyte between a lead iodide cathode and a lithium anode.

Another example of a printed lithium cell is disclosed in U.S. Pat. No. 5,035,965 to Sangyoji et al. The proposed electrolyte is an ion-conductive polymer obtained by mixing polyethylene oxide with lithium salt. Screen printing is used to apply the polymer electrolyte to a metal foil electrode, and a so-called UV-calcinating oven dries the electrolyte into a solid form. Ordinary electrolytes are generally not ionically conductive in a solid form; and polymer based electrolytes, such as those disclosed in the Sangyoji et al. patent, are generally not useful for formulating printing inks of more rapid transfer printing operations, such as flexographic printing.

SUMMARY OF INVENTION

We propose the manufacture of electrochemical cells with an electrolyte that can be laid down as a liquid printable ink and subsequently transformed to perform additional functions such as separating electrodes, holding position, preserving ionic conductivity, or bonding cell layers together. For example, electrolyte formulations can be made that are particularly suitable for transfer or injection printing but can also be cured into an adhesive state.

One method of forming a succession of such electrochemical cells along an in-line press includes formulating an electrolyte composition containing both an electrolyte and a monomer. The electrolyte composition is printed in a succession of patterns on an advancing web and is subsequently transformed by converting the monomer into a polymer that forms a matrix within which the electrolyte is embedded. The successions of electrolyte and electrode patterns are arranged to form a succession of electrochemical cells along the web.

The electrolyte composition containing the monomer preferably has low viscosity and low adhesive characteristics consistent with conventional liquid printing ink and is adaptable to ink printing techniques such as transfer or injection printing. The transformation step increases both the viscosity and the adhesive characteristics of the printed electrolyte composition for performing a bonding function between other layers supported on the web. The resulting electrolytic adhesive holds position within the cell and is less susceptible to drying out.

Another method emphasizing the printing of electrochemical cells with electrolyte patterns having high-adhesive properties starts with an electrolyte composition that is formulated for having low adhesive properties. The electrolyte composition having low adhesive properties is printed in a repeating pattern along an advancing web. The repeating patterns are chemically transformed to exhibit high adhesive properties, which is useful for such purposes as bonding other cell layers together or separating overlapping electrode layers. The chemical transformation can involve polymerizing or crosslinking the electrolyte composition resulting, for example, in a patterned electrolyte that is also a pressure-sensitive adhesive.

Transfer printing can be used for printing electrochemical cells along an in-line press by separately formulating at least one electrode composition and an electrolyte composition in transfer inks. The electrode composition and the electrolyte composition are printed by successive printing stations of the in-line press in repeating patterns on at least one of two web layers. A curing station chemically transforms the electrolyte composition into an electrolytic pressure-sensitive adhesive that bonds the two web layers together and that completes at least a portion of an ionically conductive pathway between two electrodes of a progression of transfer-printed electrochemical cells.

Injection printing can also be used for printing similar electrochemical cells along an in-line press by formulating the electrolyte composition to permit pooling of the electrolyte in pre-formed reservoirs. A succession of the reservoirs is formed along an advancing web, and a periodic injection of a metered volume of the electrolyte fills the reservoirs. The electrolyte, which is injected in a flowable form, assumes the shape of the reservoirs by force of gravity. A subsequent curing step chemically transforms the electrolyte into a more permanent form, such as a pressure-sensitive adhesive.

The in-line manufacture of electrochemical cells in accordance with our invention can also include the laying down of more than one electrolyte layer. At least one web supporting anode and cathode layers in successions of patterns is advanced through an in-line press. A first layer of electrolyte is laid down in a succession of patterns on the anode layer, and a second layer of electrolyte is laid down in a succession of patterns on the cathode layer. The two electrolyte layers are cured while separately in contact with the anode and cathode layers. A laminating operation joins the two cured electrolyte layers together to complete ionically conductive pathways between the anode and cathode layers.

Curing individual electrolyte layers in contact with one or both electrode layers improves ionic conductivity between the electrolyte and electrode layers by eliminating surface formations that can block ion transfers. Individual layers of electrolyte can be later joined together without the same adverse consequences because of their natural affinity for each other. In addition, the enhanced flow characteristics of the applied electrolyte allow the electrolyte to conform to surface irregularities, particularly those of printed electrodes having rough or granular surfaces. The more intimate molecular contact between the electrolyte and electrode layers improves both bonding strength and ionic conductivity through the interface.

One version of an electrochemical cell arranged in accordance with our invention includes two electrode layers and an electrolyte composition laid out on at least one substrate. The electrolyte composition is chemically transformed by polymerization into a matrix structure containing an embedded electrolyte with disassociatable ions moveable between the electrode layers.

The electrolyte composition is preferably polymerized in contact with the one electrode layer forming an interface that promotes movement of ions between the one electrode layer and the electrolyte composition. The electrolyte composition can also be laid down in two layers that are separately cured in contact with the two electrode layers and that are later joined to complete an ionically conductive pathway between the electrode layers.

DETAILED DESCRIPTION

Much of this invention is focused on the printing and transformation of electrolyte, particularly for the purpose of advancing the manufacture of printed electrochemical cells. The arrangement of such cells can vary widely, such as electrodes laid out side-by-side or in stacked configurations. The electrodes can also be shaped to provide portions of an electronically conductive pathway independent of an ionically conductive pathway supported by the electrolyte. Other layers including conductors, collectors, and dielectric separators can also be used to support cell functions.

We generally prefer to print all of the active cell layers along one or more advancing webs but recognize that one or more of the electrodes or other active layers could be formed in advance along the webs. Some of the many cell configurations applicable to this invention are disclosed in commonly owned applications and patents which include: U.S. Pat. No. 5,912,759, entitled "Electrochemical Display Cell with Focused Field"; U.S. Pat. No. 5,930,023, entitled "Electrochemical Display and Timing Mechanism with Migrating Electrolyte"; U.S. application Ser. No. 09/139,495, entitled "Electrochemical Cell with Deferred Assembly"; and U.S. application Ser. No. 09/340,235, entitled "Interactive Electrochemical Displays". All of these patents and applications are hereby incorporated by reference.

Figure 1:
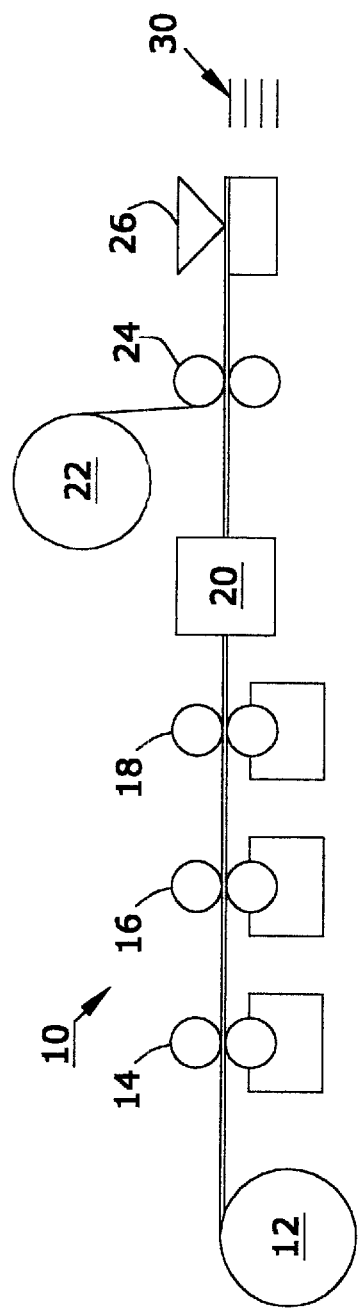
FIG. 1 is a diagram of an in-line press having transfer printing stations for forming a succession of electrochemical cells.
Figure 2:
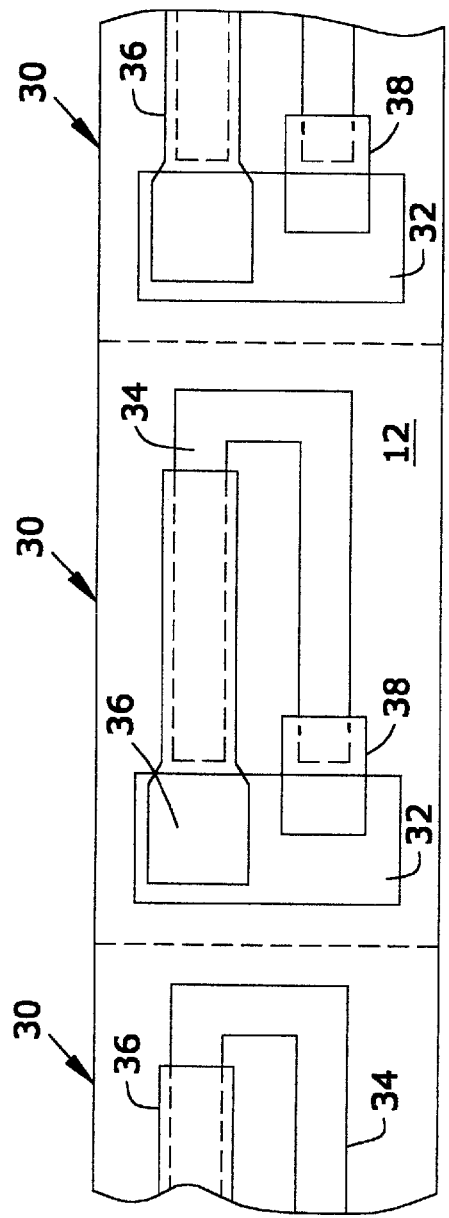
FIG. 2 is a plan view of the cells made on the press of FIG. 1 and arranged to provide display or timing functions.

FIG. 1 contains a diagram of an in-line press 10 intended for flexographic printing, which is a form of transfer printing involving a rotary letterpress with flexible printing plates. A web 12 is unrolled and advanced through two flexographic printing stations 14 and 16 for printing successions of side-by-side electrode patterns 32 and 34 shown in FIG. 2. Alternatively, the web 12 could contain a pre-deposited electrode layer that is patterned by a printed dielectric.

An electrolyte layer 36 in accordance with our invention can be formulated as a flexographic ink that is laid down over the electrodes 32 and 34 in a succession of patterns by a printing station 18. A curing station 20, which preferably effects a radiation cure by ultraviolet or ion beam radiation, transforms the electrolytic ink into an electrolytic adhesive, such as a pressure-sensitive adhesive.

Another web 22 is at least partially bonded together with the web 12 by the electrolytic adhesive at a laminating station 24 to protect the active cell layers. The two webs 12 and 22 preferably function as low vapor transmission films, and the laminating step can also include a heat-sealing operation that further protects the active cell layers from loss of moisture or exposure to the surrounding environment. Another portion (e.g., a "wing") of the web 12 could be separated or folded and used in place of the web 22. Subsequently, a die cutting station 26 separates the electrode and electrolyte patterns 32, 34, and 36 into individual electrochemical cells 30 or into groups of individual electrochemical cells 30 that can be joined to form a battery.

Various other layers can also be printed to complete the cells 30 including layers forming a switch 38, as well as dielectrics, conductors, collectors, and other adhesives. The cells 30 are arranged to provide internal functions such as display or timing functions but can be connected to external circuits to also function as low power sources or switches.

An electrolyte mix formulated for flexographic printing includes the following components:

0.76 gms thickener (Cyanamer N-300 LMW), 38 gms water, 8.5 gms electrolyte (KCI), 15 gms glycerine, 31 gms glacial acrylic acid, and 1 gm cross-linker (Darocur 1173).

Mixing is done in the order indicated with the thickener added in a ratio equal to about 2% of the water content to obtain a desired viscosity for flexographic printing on press. The listed thickener is a polyacrylamide available from Cytec Industries, Inc. of West Patterson, N.J. More or less of the electrolyte solution can be used to optimize ion conduction between the electrodes. The Darocur 1173 cross-linker for the acrylic acid monomer (chemically listed as 2-hydroxy-2-methyl-1-phenyl-1-propanone) is supplied by Ciba Specialty Chemical Corporation of Tarrytown, N.Y.

The preferred curing operation involves exposing the electrolyte layer 36 to ultraviolet light of approximately 1200 milli-joules per square centimeter using a "D" bulb on a Fusion 300S system. Most affected is the acrylic acid monomer that is chemically transformed in the presence of the cross-linker into a polymer functioning as a pressure-sensitive adhesive. The new polymer structure provides a matrix within which KCI electrolyte is embedded.

Additional layers of electrolyte layer can be printed over the electrolyte layer 36 and alternately cured to build additional thickness. Each additional layer is also preferably formulated having low adhesive properties (low stickiness) consistent with the requirements of flexographic or other transfer-printing techniques and is preferably cured to exhibit the high adhesive properties (high stickiness) of a pressure-sensitive adhesive prior to the application of the next layer.

Figure 3:
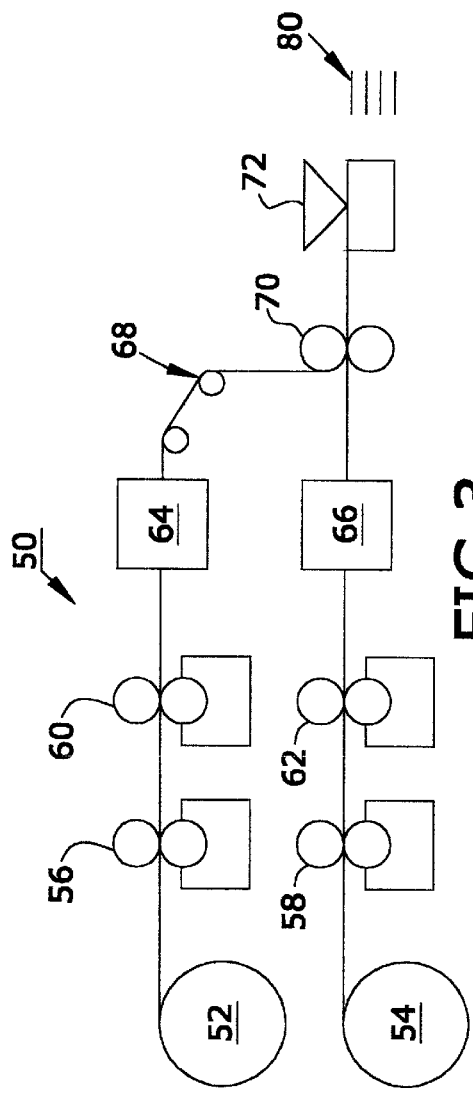
FIG. 3 is a diagram of another in-line press having transfer printing stations for forming a succession of electrochemical cells.
Figure 4:
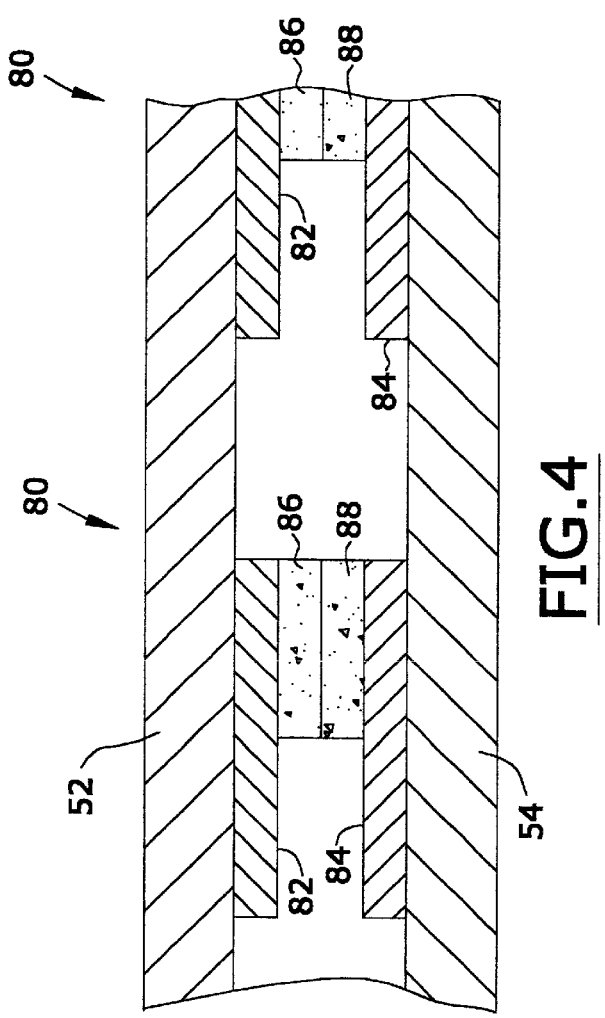
FIG. 4 is a cross-sectional view of the cells made on the press of FIG. 3 and arranged for providing a source of electrical power to an external circuit.

Another in-line flexographic press 50 shown in FIG. 3 includes two starting webs 52 and 54 that are unwound into separate printing stations 56 and 58 for printing electrode patterns 82 and 84 of a succession of electrochemical cells 80 (shown in FIG. 4). Similar printing stations 60 and 62 print electrolyte patterns 86 and 88 over the electrode patterns 82 and 84. Curing stations 64 and 66, which preferably expose the electrolyte patterns 86 and 88 to ultraviolet radiation, chemically transform the electrolyte of the electrolyte patterns 86 and 88 into electrolytic adhesive.

The initial printing of the electrolyte patterns 86 and 88 on the printed electrode patterns 82 and 84 in a low-viscosity ink enables the electrolyte to fill crevices, pores, and voids in the printed electrode patterns 82 and 84, which can have rough or granular surfaces. Some of the printed electrolyte flows into the surface features of the printed electrolyte patterns 82 and 84 prior to curing so that, upon curing, the electrolyte patterns 86 and 88 are maintained in more intimate molecular contact with the printed electrode patterns 82 and 84. The enhanced interfacial contact improves bonding strength and provides more area for ion transfers between the printed electrode and electrolyte patterns 82, 86 and 84, 88. In addition, curing the electrolyte patterns 86 and 88 already in contact with the electrode patterns 82 and 84 avoids the formation of surface barriers that could interfere with the movement of ions between the printed electrode and electrolyte patterns 82, 86 and 84, 88.

An inverter station 68 and a laminator 70 register and join the two webs 52 and 54 together. The two cured electrolyte patterns 86 and 88 are joined together to complete a succession of ionically conductive pathways between the electrode layers 82 and 84. Other functions performed by the cured electrolyte patterns 86 and 88 include physically separating the electrode layers 82 and 84 and bonding the two webs 52 and 54 together. The polymer form of the cured electrolyte patterns 86 and 88 also holds the electrolyte in place and reduces exposure to evaporation.

The two webs 52 and 54 could also be arranged as two lateral portions of a single web that are separated or folded together in advance of the laminator 70. Heat sealing is preferably used to bond the two webs 52 and 54 or web portions together. Dielectric adhesives or other bonding techniques could also be used to protect the cell layers from undesirable interactions with the surrounding environment.

A die cutter 72 divides the succession of printed cells into individual electrochemical cells 80 or into groups of the individual electrochemical cells 80. Other operations can also be performed to mount the cells 80 on other laminates or substrates or to connect the cells 80 to electrical loads. Other layers can also be assembled to support cell functions including displaying, switching, or timing functions.

The examples so far highlight the invention's special applicability to flexographic printing of electrochemical cells. Similar benefits can be obtained by other transfer-printing techniques including conventional letterpress, gravure, and lithography where a printed image is transferred from a printing plate to a web or sheet. Some benefits even accrue to screen-printing techniques, especially where monomer electrolyte mixtures are advantageous for printing and polymer electrolyte transformations are needed to perform additional functions.

Another printing technique especially suited to the printing of electrolyte in accordance with our invention is injection printing, which involves dispensing a metered volume of flowable electrolyte into a pre-formed reservoir. The electrolyte conforms to the shape of the reservoir. Curing transforms the electrolyte into a more permanent shape.

Figure 5:
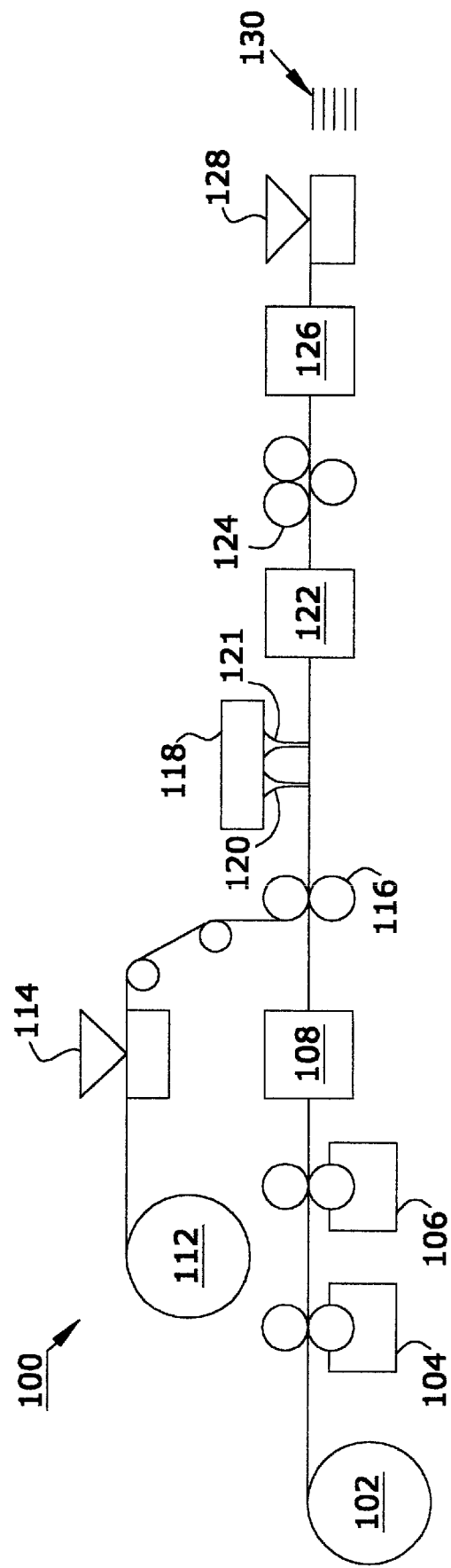
FIG. 5 is a diagram of an in-line press having a combination of transfer and injection printing stations for forming a succession of electrochemical cells.
Figure 6:
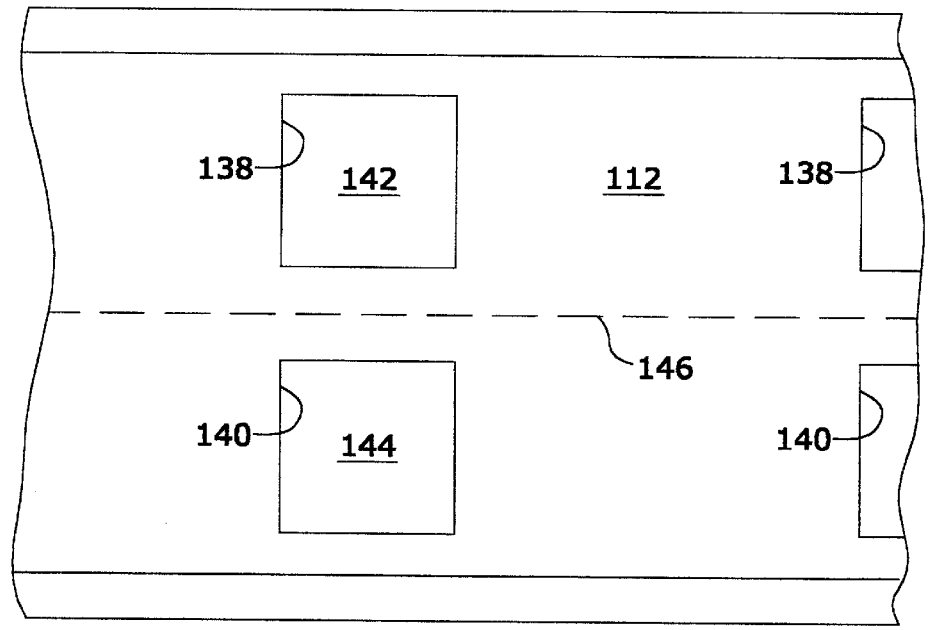
FIG. 6 is a plan view of a web section having advanced just part way through the press of FIG. 5 showing the electrochemical cells in a partial state of completion.
Figure 7:
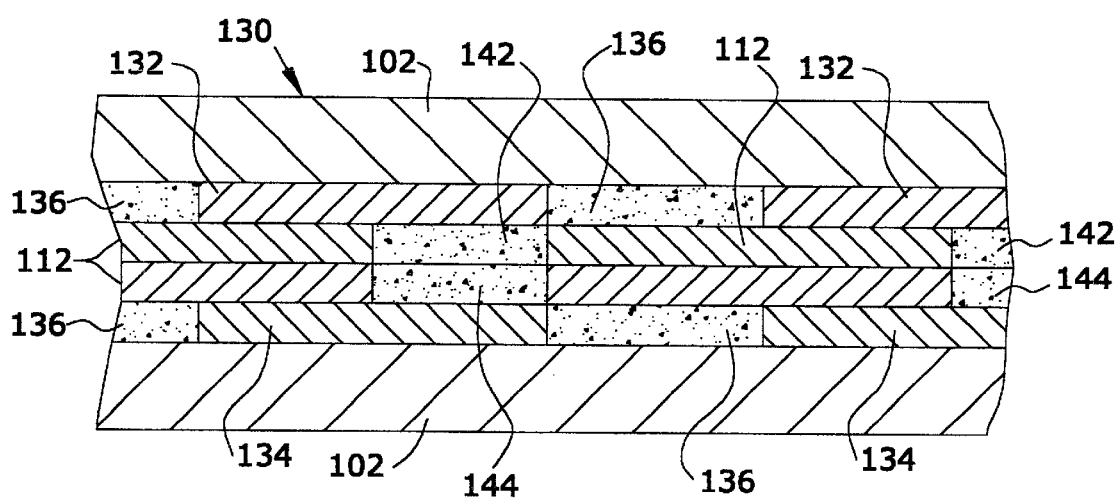
FIG. 7 is a cross-sectional view of the completed cells made on the press of FIG. 5.

FIG. 5 depicts an in-line press 100 employing both transfer and injection printing techniques for making a succession of electrochemical cells 130, which are further depicted in FIGS. 6 and 7. A web 102 is unrolled and advanced through two transfer printing stations 104 and 106 for laying down pairs of electrodes 132 and 134 in a succession of parallel patterns along the web 102. A screen printing station 108 applies a dielectric pressure-sensitive adhesive layer 136 in a succession of patterns surrounding the electrodes 132 and 134. A mask 112 is unrolled and advanced through a die cutting station 114, which removes portions of the mask 112 in a succession of patterns. A laminator 116 registers and joins the mask 112 to the web 102 through a bond formed by the dielectric adhesive 136. The die cut patterns of the mask 112 form parallel successions of reservoirs 138 and 140 that expose portions of the two electrodes 132 and 134.

An injection printing station 118 injects metered volumes of electrolyte 142 and 144 into the reservoirs 138 and 140 through a pair of nozzles 120 and 121. The injected electrolyte 142 and 144 is formulated so that the injected volumes flow under the force of gravity to conform with boundary shapes of the reservoirs 138 and 140. In other words, the injected electrolyte 142 and 144 has a zero yield value. Also, the viscosity of the injected electrolyte 142 and 144 is low enough so that the injected electrolyte 142 and 144 reaches its imposed boundaries within the reservoirs 138 and 140 without undue delay that could significantly extend the press 100. The same rheological flow characteristics also provide intimate contact between the injected electrolyte 142 and 144 and the underlying electrodes 132 and 134, which form the bottoms of the reservoirs 138 and 140.

Proceeding level until the reservoirs 138 and 140 are completely filled, the web 102 advances through a curing station 122 that transforms the injected electrolyte 142 and 144 into successions of more permanent shapes matching the shapes of the reservoirs 138 and 140. Radiation curing with ultraviolet light is preferred, but other curing methods can be used in conjunction with different electrolyte formulations. The transformation can include (a) transforming the electrolyte from a zero yield value to a higher yield value, (b) transforming the electrolyte from a state of lower viscosity to a state of higher viscosity, and (c) transforming the electrolyte from a state of lower adhesiveness to a state of higher adhesiveness, resulting for example in a pressure-sensitive adhesive. Also, the electrolyte 142 and 144 is preferably formulated to contain a monomer that is transformed into a polymer that forms a matrix within which the electrolyte is embedded. The earlier-described formulation for a flexographic ink electrolyte can serve all of these purposes.

A combined folding and laminating station 124 folds the web 102 along its longitudinal axis 146 and presses the cured electrolyte 142 and 144 into mutual contact to complete ionically conductive pathways between the electrodes 132 and 134. A heat sealing station 126 bonds the folded portions of the web 102 together and protects the electrolyte 142 and 144 from evaporation or other undesirable interactions with the surrounding environment. Another die cutting station 128 divides the advancing web 102 into individual or groups of electrochemical cells 130.

Instead of folding the web 102 together, the web 102 could be cut into separate sections prior to lamination or an additional web could be printed and laminated together with the web 102. The mask could also be formed from a lateral portion of the web 102 and folded to form the required reservoirs. In place of the mask 112, impressions could be made in the web 102 to provide similarly shaped recesses for confining the injected electrolyte 142 and 144.

More operations can be formed along any of the in-line presses 10, 50, or 100 to support additional functions of the electrochemical cells 30, 80, or 130 or to relate the electrochemical cells to other mountings, components, or circuits. For example, printed conductors, such as carbon strips, can be arranged to allow completion of electronically conductive pathways within or between the cells. The electrodes could also be printed on a carbon base, which can also function as a conductive pathway.

We claim:

1. A method of forming a succession of electrochemical cells along an in-line press comprising the steps of:

advancing at least one web along an in-line press;

formulating an electrolyte composition containing an electrolyte and a monomer;

printing the electrolyte composition in a succession of patterns on the at least one web;

chemically transforming the electrolyte composition converting the monomer into a polymer that forms a matrix within which the electrolyte is embedded; and arranging the succession of electrolyte patterns in relation to a succession of electrode patterns to form a succession of electrochemical cells along the at least one web.

2. The method of claim 1 in which said step of chemically transforming the electrolyte composition includes chemically transforming the electrolyte composition from an electrolyte composition within which the monomer contributes low adhesive properties to the electrolyte composition into an electrolyte composition within which the polymer contributes high adhesive properties to the electrolyte composition.

3. The method of claim 2 in which the electrolyte composition containing the monomer is formulated for transfer printing and said step of printing includes transfer printing the electrolyte composition.

4. The method of claim 3 in which the chemically transformed electrolyte composition containing the polymer is a pressure-sensitive adhesive.

5. The method of claim 2 in which the electrolyte composition containing the monomer is formulated for injection printing and said step of printing includes injection printing the electrolyte composition.

6. The method of claim 5 in which the electrolyte composition containing the monomer is flowable under force of gravity.

7. The method of claim 1 in which said step of chemically transforming includes radiation curing of the electrolyte composition.

8. The method of claim 1 in which the matrix holds the electrolyte in place without preventing movement of ions between the electrodes.

9. The method of claim 8 in which the matrix also functions as a separator between the electrodes.

10. The method of claim 8 in which the matrix also functions as an adhesive for bonding layers of the at least one web together.

* * * * *